July 12, 1955    S. BRIGHT, JR    2,712,777
METHOD OF MAKING FOLDING PLASTIC CONTAINERS
Filed April 22, 1949    3 Sheets-Sheet 3
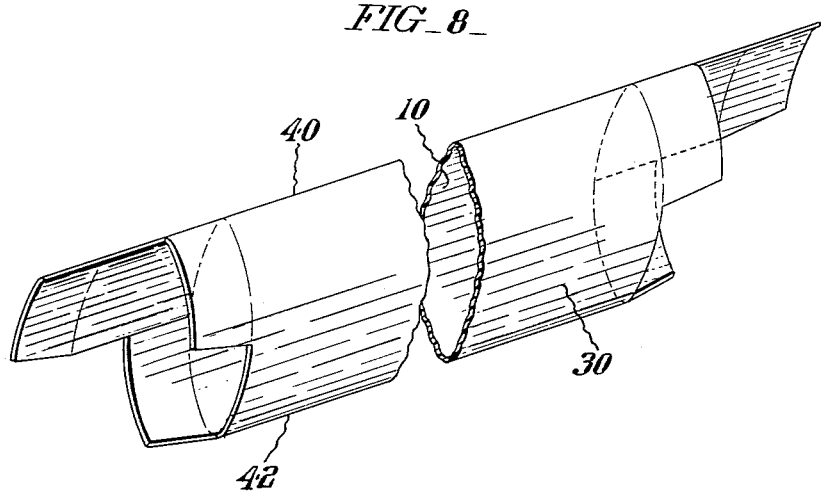
FIG_8_
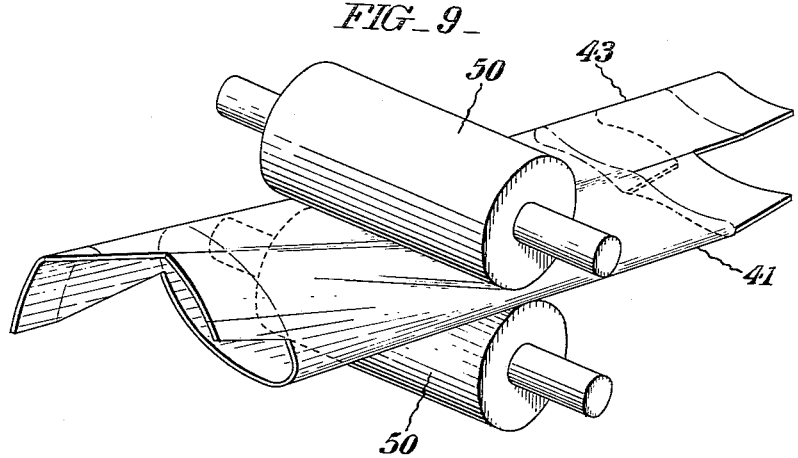
FIG_9_
INVENTOR.
Stanley Bright, Jr.,
BY Paul & Paul
ATTORNEYS.

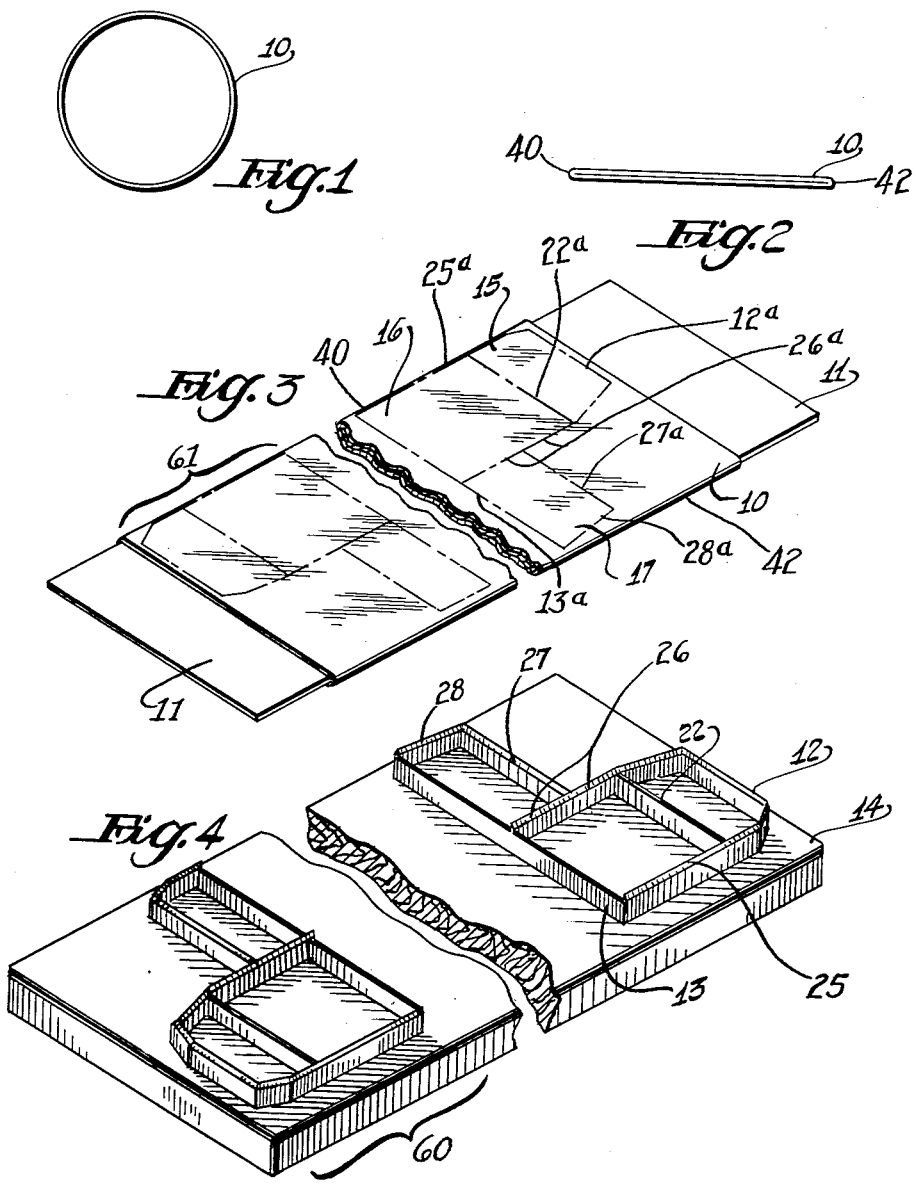

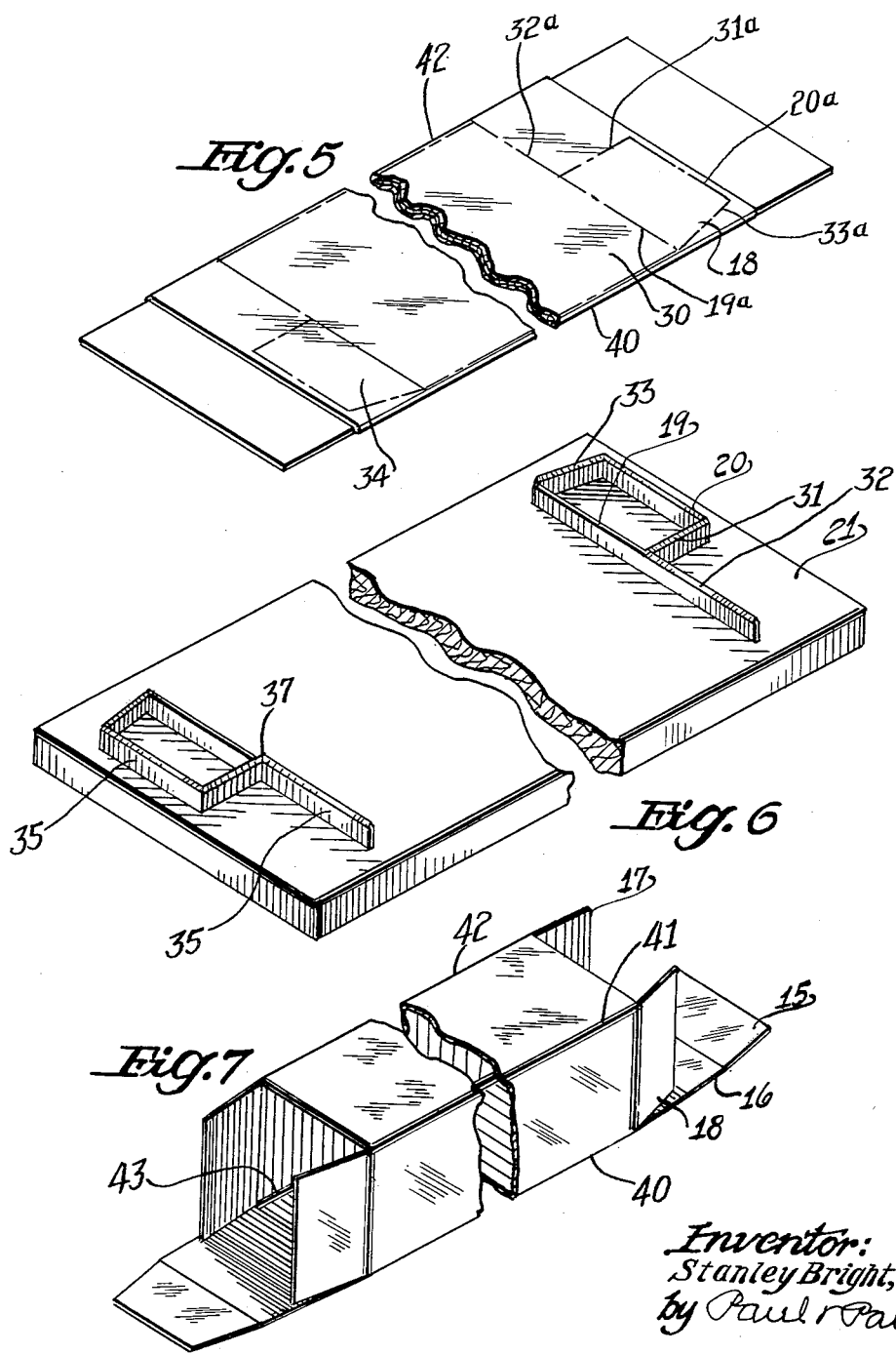

United States Patent Office 2,712,777
Patented July 12, 1955

2,712,777

METHOD OF MAKING FOLDING PLASTIC CONTAINERS

Stanley Bright, Jr., Haverford, Pa., assignor to Troth Bright Page, Inc., Paoli, Pa., a corporation of Pennsylvania Application April 22, 1949, Serial No. 88,943

3 Claims. (Cl. 93—36)

This invention relates to a method of making folding plastic containers, and further relates to a method of making a seamless plastic folding container blank. More particularly, the invention relates to a method which comprises extruding a plastic tube of enclosed cross section, folding the tube substantially flat, inserting a separator between the folds, cutting and scoring the transparent material at each side of the separator to provide flaps or tabs, and folding the blank flat along fold lines between the original fold lines.

Plastic folding containers, which are relatively new in the art, are usually assembled in final form by heat sealing or by means of adhesives applied along a flap element. The fabrication of containers by this method involves not only an extra operation but also results in a visible line along the joining element.

It is accordingly an object of this invention to provide a rapid and economical method of making a plastic folding container having no adhesive seams. It is another object of my invention to make a strong, durable plastic folding container blank in the form of a flat double sheet for convenience and economy in shipping. Other objects and means for carrying them into effect will appear hereinafter and in the drawings, in which:

Fig. 1 is an end view of the extruded plastic tube produced in the extrusion step of my process.

Fig. 2 is a view similar to that of Fig. 1, showing the same end of the extruded plastic tube after flattening.

Fig. 3 is a perspective view of my flat extruded plastic tube and interposed separator, showing the contemplated cutting and scoring lines on the plastic in dashed lines.

Fig. 4 is a perspective view of a cutting and scoring die for cutting and scoring the plastic along the dashed lines appearing in Fig. 3.

Fig. 5 is a perspective view similar to Fig. 3 showing the reverse side of the flat extruded plastic and separator of Fig. 3, with dashed lines indicating the desired cutting and scoring lines thereon.

Fig. 6 is a perspective view looking toward the effective cutting and scoring edges of a cutting and scoring die, the edges of which correspond to the dashed lines of Fig. 5 and which are adapted to cut and score the plastic of Fig. 5 along these lines; and Fig. 7 is a perspective view of a plastic folding container produced by my process.

Fig. 8 is a perspective view of a flat extruded plastic tube which has been cut and scored in accordance with my invention, the mandrel having been removed and the tube being opened to its tubular form preparatory to the second flattening operation.

Fig. 9 is a perspective view of the tube of Fig. 8 being flattened by rolling means to form a four-sided container.

In practicing the method which constitutes my invention a suitable transparent plastic material is first extruded through a set of dies or other extruding means. For purposes of the first step the plastic may consist of a transparent, organic thermoplastic or thermosetting material such as cellulose acetate, polyethylene resins, methyl methacrylate resins, vinyl acetate-vinyl chloride copolymers, vinylidene chloride copolymers, or other plastics which become partially fluid under pressure and revert to an inflexible physical state when the pressure is released. It will be understood that a particular plastic material may be preferred in certain cases in view of the desired characteristics of the finished container for particular purposes.

The extrusion of several varieties of plastics may be accomplished at ordinary temperatures by application of pressure against the bulk plastic material to force it through a die. In some cases, however, it is found desirable to enhance the plasticity of the plastic and for this purpose one of the various known plasticizers may be compounded into the particular plastic to be extruded. It is also possible to include minor amounts of solvent in the plastic to facilitate extrusion. In practicing the extrusion step of my invention, the plastic material may be forced through the annular space between a pair of extrusion dies or in other apparatus commonly employed for the extrusion of plastic material of this type. The dies are preferably circular in shape and produce a continuous hollow plastic tube. Plastic structures having closed cross sections of any kind are referred to herein as tubes. In carrying out the extrusion step of my method, the extrusion dies may be heated to attain preferred extrusion of some plastic materials, and to drive off any solvent that may have been included in the original plastic stock, but in many instances the extrusion may be accomplished without heating.

As hollow plastic tube 10 (Fig. 1) emerges from the extrusion device, it is flattened between spaced rolls to form a pair of opposed plastic walls as indicated in Fig. 2, assuming a relatively rigid, substantially flattened shape. A flat metal separator or mandrel 11 is then inserted between the walls of the flattened plastic tube as shown in Fig. 3, conforming with longitudinal folding lines 40 and 42. With the separator interposed between the plastic walls, cutting and scoring dies (Figs. 4 and 6) which are positioned at opposite sides of the plastic are brought toward each other and are contacted simultaneously under pressure with each of the flat opposed surfaces of the extruded plastic. A force exerted by one of these dies is opposed by the other die, cutting and scoring the plastic on both sides of the mandrel at the same time along predetermined cutting and scoring lines. It will be observed that the exertion of an opposed force between the dies forces cutting edge 12, which is made of steel or other cutting metal, completely through the plastic wall 10 along the line designated 12a in Fig. 3. The knife edge then contacts mandrel 11 which is sufficiently rigid to protect the opposed plastic wall 30 from the knife blade by resisting the penetration of the cutting edges of the die. The other cutting edges of the dies are similar to cutting edge 12. The scoring elements of the dies are provided with blunt edges which penetrate the plastic wall only part way. They stretch the plastic along predetermined lines by application of pressure, rendering the thin plastic foldable along the scoring lines. By reference to Fig. 4 it will be seen that cutting edge 25 extends above scoring edge 13 so as to cut through the plastic while the plastic is simultaneously scored. The other cutting and scoring edges are similarly arranged. Die 14 (Fig. 4) is provided with cutting edges 12, 25, 26, 27 and 28, which cut plastic face 10 of Fig. 3 along lines 12a, 25a, 26a, 27a, and 28a respectively. Simultaneously, scoring edges 22 and 13 score plastic face 10 of Fig. 3 along lines 22a and 13a respectively, completing the formation of the end of the container 16 and flaps 15 and 17. The cutting and scoring edges shown at end 60 of the die in Fig. 4 operate in a manner similar to the aforementioned cutting and scoring edges, and cut and score the corresponding end 61 of plastic 10 as shown in Fig. 3.

The opposing face of the extruded plastic, designated as 30 in Fig. 5, is similarly cut and scored by means of cutting and scoring die 21 (Fig. 6). Cutting edges 20, 31, 32 and 33 of die 21 cut the plastic material along dashed lines 20a, 31a, 32a, and 33a of Fig. 5, respectively. Scoring edge 19 similarly scores the plastic along line 19a of Fig. 5 completing the formation of flap 18 which is foldable along line 19a. Flap 34 is similarly formed by the cutting and scoring edge unit designated 35 in Fig. 6. The cutting and scoring steps may be carried out separately, and each plastic wall may be cut or scored separately if this is desired in a particular instance. However, I find that the insertion of a thin flat separator or mandrel affords sufficient backing to permit the simultaneous independent cutting and scoring of both plastic walls, thereby completing four steps in a single operation even when different prearranged cutting and scoring lines are applied to the opposed plastic walls. It should also be noted that the cutting and scoring operations may be performed on a continuous strip of extruded and flattened plastic material moving over an interposed separator which may be extended to make it possible to employ a plurality of cutting and scoring dies in nested relationship. For mass production this feature is of great importance since it provides a continuous process for making plastic folding container blanks.

After completion of the cutting and scoring steps, mandrel 11 is withdrawn, the plastic cuttings are separated from the scored sheet, and the flat sheet is opened to a tubular form by separating plastic wall 10 from plastic wall 30 and bringing edges 40 and 42 closer together (Fig. 8). The plastic tube is then flattened by rolling while cold or at an elevated temperature by the rollers 50, forcing the surfaces which includes edges 40 and 42 closer together until they are substantially flat as shown in Fig. 9. The pressure of the roller thus forms opposed edges 41 and 43. In making a square cross section, edges 41 and 43 are midway between edges 40 and 42. However, other rectangular cross sections of desired shapes may be made by controlling the relative positions of edges 40 and 42 during the rolling operation. New longitudinal folding lines 41 and 43 are formed whenever the tube is rolled while maintaining contact between the rolling device and the original folding edges 40 and 42, which are not materially deformed by the rollers 50. On completion of the final rolling step, the container shown in Fig. 7 is attained by opening out the opposed flattened surfaces. The flaps and tucks are foldable along their respective scoring lines, providing appropriate end closures for the container.

As a modification of my new process, I form edges 41 and 43 by including appropriate scoring edges in the dies shown in Figs. 4 and 6. According to this method, a scoring edge is provided along the continuation of the line defined by cutting edge 26 (Fig. 4) and a scoring edge is provided along the line drawn from the end of cutting edge 31 to the end of cutting edge 37. The opposing force set up between the dies scores the plastic along the desired lines and produces folding lines 41 and 43 at the same time the other cutting and scoring operations are carried out. Folding lines 41 and 43 may be positioned as desired with respect to folding lines 40 and 42. This modification of my process is advantageous in some cases since it eliminates the necessity of a final folding step as previously described herein. However, in connection with some extruded plastics particularly those with relatively thick walls it is preferable to perform the final folding step instead of a die-scoring step since it is relatively difficult in forming along edges to fold these materials inward when the material has been scored on the outside. However in the fabrication of a relatively thin-walled container of pliable plastic it is often possible to score the plastic on the outside of the fold with excellent results at a considerable saving in cost.

It will be apparent that my new method may be practiced in connection with any suitable plastic material that may be selected by a person skilled in the field of plastics. In those cases where it is desired to avoid further folding after the cutting and scoring operation it is possible, and at times preferable, to flatten the original tubing in two directions prior to the cutting operation thereby providing folding lines along the four longitudinal edges. The invention may similarly be adapted to the manufacture of containers of widely varying shapes and designs, and it is not intended that the scope of the invention be limited, other than by the express provisions of the claims.

Having thus described my invention, I claim:

1. A method of making a plastic folding container from an extruded plastic tube of open cross section comprising flattening said tube to form folded side edges, inserting a flat rigid separator into said flattened tube, applying opposing cutting and scoring dies forcibly against the flattened walls of the tube and the separator to cut and score each of said walls, removing the cuttings from said flattened tube, withdrawing said separator therefrom, separating the walls of the flattened tube, and forcing the walls of the tube together by rolling to form fold lines between the original folded side edges.

2. A method of making a plastic folding container from an extruded plastic tube of open cross section comprising flattening said tube to form folded side edges, cutting a section from said flattened tube, interposing a flat rigid separator between the walls of said section, cutting and scoring each of said plastic walls simultaneously along predetermined cutting and scoring lines in opposite sides of the separator, withdrawing said separator, removing the cuttings from the plastic section, separating the walls of the flattened section to form a tubular section, and forcing the walls of the tubular section together by rolling to form fold lines betwen the original folded side edges.

3. A method of making a plastic folding container from an extruded hollow plastic tube comprising flattening said tube by rolling, cutting a section from said flattened tube, inserting a flat rigid mandrel between the opposed flattened walls of said section, simultaneously contacting cutting knives to each of said flattened walls under sufficient pressure to cut completely through said walls along prearranged cutting lines without cutting through said mandrel, contacting opposed blunt scoring elements simultaneously with said cutting to each of said flattened walls under sufficient pressure to stretch the plastice along predetermined scoring lines and for a sufficient time to reduce the thickness of the plastic, withdrawing said mandrel from the flattened section, removing the cuttings from the plastic walls, separating the walls of the flattened section to form a tubular section, and forcing the walls of the tubular section together by rolling along fold lines between the original edges of the flattened section.

References Cited in the file of this patent

UNITED STATES PATENTS

| Number | Name | Date |
|---|---|---|
| 747,355 | Baird | Dec. 22, 1903 |
| 996,785 | Motz | July 4, 1911 |
| 1,461,967 | Butterfield | July 17, 1923 |
| 1,578,787 | Westren | Mar. 30, 1926 |
| 2,057,295 | Engel | Oct. 13, 1936 |
| 2,079,177 | Membrino | May 4, 1937 |
| 2,097,690 | Ferngren | Nov. 2, 1937 |
| 2,157,794 | MacDonald et al. | May 9, 1939 |
| 2,232,640 | Schwartzman | Feb. 18, 1941 |
| 2,241,817 | Howard | May 13, 1941 |
| 2,437,884 | Maynard | Mar. 16, 1948 |
| 2,527,398 | Chavannes | Oct. 24, 1950 |
| 2,576,826 | Dobbs et al. | Nov. 27, 1951 |
| 2,589,022 | Page et al. | Mar. 11, 1952 |
| 2,600,254 | Lysobey | June 10, 1952 |